US009883340B2

(12) United States Patent
Boldyrev et al.

(10) Patent No.: US 9,883,340 B2
(45) Date of Patent: Jan. 30, 2018

(54) METHOD AND APPARATUS FOR PROVIDING GROUP ROUTE RECOMMENDATIONS

(75) Inventors: Sergey Boldyrev, Söderkulla (FI); Debmalya Biswas, Lausanne (CH); Lauri Tarkkala, Berlin (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 13/572,020

(22) Filed: Aug. 10, 2012

(65) Prior Publication Data
US 2014/0046591 A1 Feb. 13, 2014

(51) Int. Cl.
*G01C 21/34* (2006.01)
*H04W 4/02* (2009.01)
*G06Q 30/02* (2012.01)
*G01C 21/20* (2006.01)
*G06Q 10/04* (2012.01)
*H04L 12/18* (2006.01)
(Continued)

(52) U.S. Cl.
CPC ......... *H04W 4/023* (2013.01); *G01C 21/20* (2013.01); *G01C 21/3438* (2013.01); *G01C 21/3484* (2013.01); *G06Q 10/047* (2013.01); *G06Q 30/0282* (2013.01); *H04L 12/1845* (2013.01); *H04W 4/025* (2013.01); *G06Q 50/01* (2013.01); *G08G 1/0962* (2013.01); *H04W 12/02* (2013.01)

(58) Field of Classification Search
CPC ............... G01C 21/34; G01C 21/3446; G01C 21/3461; G01C 21/32; G08G 1/096811
USPC .............. 701/533, 400; 707/3; 455/456.1
See application file for complete search history.

(56) References Cited

U.S. PATENT DOCUMENTS 7,856,373 B2 * 12/2010 Ullah ................ G06Q 30/02
705/14.4
7,945,653 B2 * 5/2011 Zuckerberg ............ G06Q 30/02
709/206
(Continued)

FOREIGN PATENT DOCUMENTS

WO 2012/034581 A1 3/2012

OTHER PUBLICATIONS

International Search Report and Written Opinion for corresponding Patent Application No. PCT/EP2013/063587 dated Nov. 25, 2013, 14 pages.
(Continued)

*Primary Examiner* — Shardul Patel
(74) *Attorney, Agent, or Firm* — Alston & Bird LLP

(57) ABSTRACT

An approach is provided for providing alternative route recommendations for a group of nearby users in a privacy preserving manner. A recommendation platform determines at least one group of one or more users within proximity of at least one location-based service, at least one location-based event, or a combination thereof. A recommendation platform processes and/or facilitates a processing of one or more datasets associated with the group to cause, at least in part, a determination of whether to recommend the at least one location-based service, the at least one location-based event, or a combination thereof to the group. A recommendation platform causes, at least in part, a presentation of the at least one location-based service, the at least one location-based event, or a combination thereof to the group, the one or more users, or a combination thereof based, at least in part, on the determination of whether to recommend.

14 Claims, 8 Drawing Sheets

(51) Int. Cl.
*G06Q 50/00* (2012.01)
*H04W 12/02* (2009.01)
*G08G 1/0962* (2006.01)

(56) References Cited

U.S. PATENT DOCUMENTS

| | | | | |
|---|---|---|---|---|
| 8,099,315 | B2* | 1/2012 | Amento | G06Q 30/02 705/26.7 |
| 2006/0007315 | A1* | 1/2006 | Singh | H04N 1/32128 348/207.99 |
| 2007/0149210 | A1* | 6/2007 | McKiou | H04W 64/00 455/456.1 |
| 2008/0294607 | A1* | 11/2008 | Partovi | G06Q 30/00 |
| 2010/0076951 | A1* | 3/2010 | Lyle | G06Q 10/10 707/706 |
| 2010/0130226 | A1* | 5/2010 | Arrasvuori | H04L 67/26 455/456.1 |
| 2010/0178953 | A1* | 7/2010 | Blewett | H04L 12/5895 455/550.1 |
| 2010/0191728 | A1* | 7/2010 | Reilly | G06F 17/30265 707/736 |
| 2011/0022444 | A1* | 1/2011 | Fridman | G06Q 30/02 705/14.64 |
| 2011/0124349 | A1* | 5/2011 | Midtun | H04W 4/02 455/456.3 |
| 2011/0251918 | A1* | 10/2011 | Yarvis | G06Q 30/02 705/26.7 |
| 2011/0302504 | A1* | 12/2011 | Khare | H04L 51/32 715/751 |
| 2011/0320536 | A1* | 12/2011 | Lobb | G06Q 50/01 709/205 |
| 2012/0173360 | A1* | 7/2012 | Soroca | G06Q 30/08 705/26.3 |
| 2012/0246684 | A1* | 9/2012 | Yarvis | G06Q 30/02 725/60 |
| 2012/0278387 | A1* | 11/2012 | Garcia | G06Q 50/01 709/204 |
| 2012/0299713 | A1* | 11/2012 | Elia | B60W 30/0956 340/435 |
| 2013/0005482 | A1* | 1/2013 | Kosta | G07F 17/3206 463/42 |
| 2013/0095801 | A1* | 4/2013 | Kermoian | H04M 1/72597 455/414.1 |
| 2013/0132194 | A1* | 5/2013 | Rajaram | G06Q 50/01 705/14.52 |
| 2013/0212176 | A1* | 8/2013 | Koulomzin | G06Q 50/01 709/204 |
| 2013/0238370 | A1* | 9/2013 | Wiseman | G06Q 10/02 705/5 |
| 2013/0332527 | A1* | 12/2013 | Du | G06Q 10/10 709/204 |

OTHER PUBLICATIONS

Magagna et al. "CA2P: An Approach for Privacy-Safe Context-Aware Services for Mobile Phones." UBI-Media Computing (U-Media), 2011 4th International Conference on UBI-Media Computing, IEEE, Jul. 3, 2011, pp. 89-94, XP032037336, DOI: 10.1109/U-MEDIA.2011.28, ISBN: 978-1-4577-1174-9.

Vicente et al. "Location-Related Privacy in Geo-Social Networks." IEEE Internet Computing, IEEE Service Center, New York, NY.—Institute of Electrical and Electronics Engineers, U.S. , vol. 15, No. 3, May 1, 2011, pp. 20-27, XP011354796, ISSN: 1089-7801, DOI: 10.1109/MIC.2011.29.

Office Action from corresponding European Patent Application No. 13734704.3, dated May 31, 2017, 7 pages.

Office Action from corresponding European Patent Application No. 13734704.3, dated Nov. 6, 2017, 6 pages.

* cited by examiner

METHOD AND APPARATUS FOR PROVIDING GROUP ROUTE RECOMMENDATIONS

BACKGROUND

Service providers and device manufacturers (e.g., wireless, cellular, etc.) are continually challenged to deliver value and convenience to consumers by, for example, providing compelling network services. One area of interest has been the development of location-based services to provide individual users of mobile devices (e.g., mobile phones, tablets, personal navigation devices, etc.) with alternative route information for traveling between two points (e.g., points "A" and "B"). Generally, alternative routes are displayed to a user with respect to duration and/or distance of the particular route. However, current alternative route information lacks information regarding available services that may be relevant to a user on that route. Moreover, the alternative route information is generally determined and recommended at the individual level and not at a group level. For example, a group of nearby users that share similar interests and/or social connections and could communally benefit from knowledge of nearby relevant services and/or events. Accordingly, service providers and device manufacturers face significant technical challenges in providing a service that determines alternative route recommendations based, at least in part, on available services and/or group dynamics.

SOME EXAMPLE EMBODIMENTS

Therefore, there is a need for an approach for providing alternative route recommendations for a group of nearby users in a privacy preserving manner.

According to one embodiment, a method comprises determining at least one group of one or more users within proximity of at least one location-based service, at least one location-based event, or a combination thereof. The method also comprises processing and/or facilitating a processing of one or more datasets associated with the at least one group to cause, at least in part, a determination of whether to recommend the at least one location-based service, the at least one location-based event, or a combination thereof to the at least one group. The method further comprises causing, at least in part, a presentation of the at least one location-based service, the at least one location-based event, or a combination thereof to the at least one group, the one or more users, or a combination thereof based, at least in part, on the determination of whether to recommend.

According to another embodiment, an apparatus comprises at least one processor, and at least one memory including computer program code for one or more computer programs, the at least one memory and the computer program code configured to, with the at least one processor, cause, at least in part, the apparatus to determine at least one group of one or more users within proximity of at least one location-based service, at least one location-based event, or a combination thereof. The apparatus is also caused to process and/or facilitate a processing of one or more datasets associated with the at least one group to cause, at least in part, a determination of whether to recommend the at least one location-based service, the at least one location-based event, or a combination thereof to the at least one group. The apparatus further causes, at least in part, a presentation of the at least one location-based service, the at least one location-based event, or a combination thereof to the at least one group, the one or more users, or a combination thereof based, at least in part, on the determination of whether to recommend.

According to another embodiment, a computer-readable storage medium carries one or more sequences of one or more instructions which, when executed by one or more processors, cause, at least in part, an apparatus to determine at least one group of one or more users within proximity of at least one location-based service, at least one location-based event, or a combination thereof. The apparatus is also caused to process and/or facilitate a processing of one or more datasets associated with the at least one group to cause, at least in part, a determination of whether to recommend the at least one location-based service, the at least one location-based event, or a combination thereof to the at least one group. The apparatus is further causes, at least in part, a presentation of the at least one location-based service, the at least one location-based event, or a combination thereof to the at least one group, the one or more users, or a combination thereof based, at least in part, on the determination of whether to recommend.

According to another embodiment, an apparatus comprises means for determining at least one group of one or more users within proximity of at least one location-based event, at least one location-based service, or a combination thereof. The apparatus also comprises means for processing and/or facilitating a processing of one or more datasets associated with the at least one group to cause, at least in part, a determination of whether to recommend the at least one location-based service, the at least one location-based event, or a combination thereof to the at least one group. The apparatus further comprises means for causing, at least in part, a presentation of the at least one location-based service, the at least one location-based event, or a combination thereof to the at least one group, the one or more users, or a combination thereof based, at least in part, on the determination of whether to recommend.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing alternative route recommendations for a group of nearby users in a privacy preserving manner are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
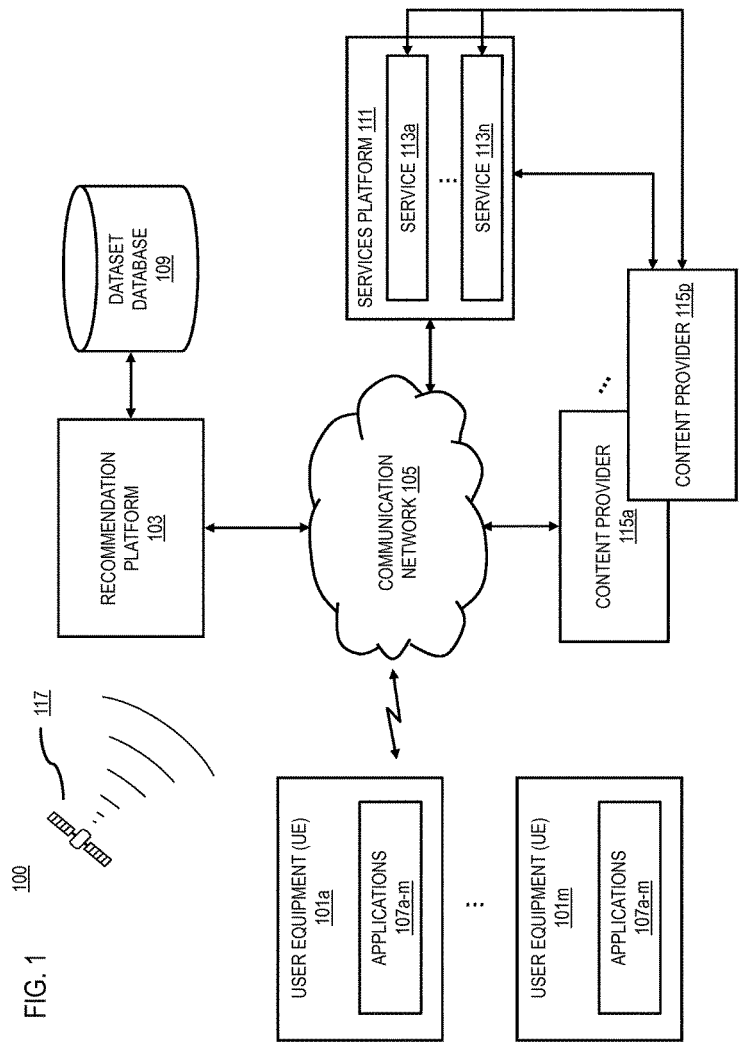
FIG. 1 is a diagram of a system capable of providing alternative route recommendations for a group of nearby users in a privacy preserving manner, according to one embodiment.

FIG. 1 is a diagram of a system capable of providing alternative route recommendations for a group of nearby users in a privacy preserving manner, according to one embodiment. As previously discussed, one area of interest among service providers and device manufacturers has been the development of location-based services to provide users of mobile devices (e.g., mobile phones, tablets, personal navigation devices, etc.) with alternative route information for traveling between two points (e.g., points "A" and "B"). Generally, alternative routes are displayed in a user interface with respect to the duration and/or the distance of the particular alternative route. However, current alternative route information lacks information regarding available services that may be relevant to a user on that route. Moreover, the alternative route information is generally determined and recommended at the individual level and not at a group level. For example, a group of nearby users may share similar interests and/or social connections and could communally benefit from knowledge of nearby relevant services and/or events.

To address this problem, a system 100 of FIG. 1 introduces the capability to provide alternative route recommendations for a group of nearby users in a privacy preserving manner. In one embodiment, the system 100 first determines at least one group of one or more users within proximity of at least one location-based service (e.g., a market, a church, a restaurant, etc.), at least one location-based event (e.g., a festival, a concert, a sporting event, etc.), or a combination thereof. In one example use case, the at least one group of one or more users may be driving in respective vehicles nearby one another using mobile devices (e.g., a mobile phone, a tablet, a personal navigation device, etc.) to navigate between two points (e.g., points "A" and "B"). In particular, the at least one location-based service, the at least one location-based event, or a combination thereof includes, at least in part, a group-oriented service, a group-oriented event, or a combination thereof. Moreover, in one or more embodiments, the system 100 determines the at least one group based, at least in part, on whether one or more datasets associated with the at least one group are at least substantially similar for all or a portion of the one or more users. More specifically, the one or more datasets include, at least in part, one or more reference datasets (e.g., user location information), one or more behavioral datasets (e.g., user habits, user preferences, etc.), one or more social datasets (e.g., user social relationship information, user social networking connections, etc.), one or more personal datasets (e.g., user profiles, user history, user interests, etc.), or a combination thereof.

In one embodiment, the system 100 then processes and/or facilitates a processing of the one or more datasets associated with the at least one group to cause, at least in part, a determination of whether to recommend the at least one location-based service (e.g., a restaurant), the at least one location-based event (e.g., a Jazz festival), or a combination thereof to the at least one group. By way of example, if the system 100 determines that the at least one group enjoys a particular Jazz band and that band happens to be playing at a nearby event, the system 100 may determine to recommend to the at least one group that the Jazz band is playing nearby and that the event offers a group discount for admission. In another example use case, if the system 100 determine that the at least one group enjoys French food and that there is a French restaurant nearby, the system 100 may determine to recommend to the at least one group that the nearby French restaurant can accommodate a large group that evening.

In one embodiment, the system 100 also determines one or more privacy settings of the one or more users, the at least one group, or a combination thereof, wherein (a) the determination of whether to recommend; (b) the presentation of the at least one location-based service, the at least one location-based event, or a combination thereof; or (c) a combination thereof is based, at least in part, on the one or more privacy settings. In particular, the system 100 requires explicit user consent (e.g., opting-in) to share privacy sensitive information with the system 100 such as a user's location, social networking connections, interests, etc. In addition, because certain group level recommendations or advertisements make sense only if they can be presented to the entire group (e.g., a group discount on admission fees), the system 100 determines the privacy settings or preferences of the at least one group as a whole (e.g., through aggregation, averaging, etc.).

In one or more embodiments, the system 100 further determines an anonymity level associated with the at least one group based, at least in part, on a number of the one or more users, wherein (a) the determination of whether to recommend; (b) the presentation of the at least one location-based service, the at least one location-based event, or a combination thereof; or (c) a combination thereof is based, at least in part, on the anonymity level. In addition, the system 100 can determine to recommend one or more locations (e.g., a sporting event) for the one or more users to travel based, at least in part, on the anonymity level. By way of example, if the system 100 determines that the at least one group consists of a small number of users (e.g., two or three), the system 100 may not recommend a nearby medically-related service (e.g., a hospital) to the at least one group to avoid incidentally divulging private information about one or more users of the at least one group. In contrast, if the system 100 determines that the at least one group consists of a large number of users, the system 100 may determine to recommend a nearby soccer game to the at least one group because most users would not mind other users knowing that they were a soccer fan, liked a particular team playing that day, enjoyed sports, etc.

In one embodiment, the system 100 then causes, at least in part, a presentation of the at least one location-based service, the at least one location-based event, or a combination thereof to the at least one group. For example, if the system 100 determines that two or three friends are nearby, that they share an interest in Jazz music, and that there is a Jazz festival nearby, the system 100 can cause, at least in part, a presentation of a recommendation or an advertisement relating to the Jazz festival with a much higher relevance to the at least one group, the two or three users, or a combination thereof. More specifically, the system 100 can cause, at least in part, a presentation of the recommendation or the advertisement as a status notification, an SMS message, etc. In one or more embodiments, the system 100 further causes, at least in part, a presentation of the at least one location-based service, the at least one location-based event, or a combination thereof in a mapping user interface, a navigation user interface, or a combination thereof (e.g., a turn-by-turn navigation application). For example, a location-based service (e.g., a restaurant) may appear as a representative icon overlaid on the standard mapping information. Moreover, wherein the mapping user interface, the navigation users interface, or a combination thereof include, at least in part, one or more alternative travel routes, the system 100 causes, at least in part, a presentation of the least one location-based service, the at least location-based event, or a combination thereof with respect to the one or more alternative travel routes. By way of example, the system 100 may cause, at least in part, a presentation of the at least one location-based service, for example, as a representative icon below the mapping information, including distance and duration information.

In one or more embodiments, the system 100 may also determine one or more responses from the at least one group, the one or more users, or a combination thereof to the presentation of the at least one location-based service, the at least one location-based event, or a combination thereof. By way of example, the system 100 may determine that the at least one group shares an interest in baseball and that a baseball game is being played nearby that afternoon. In one embodiment, if the response of the at least one group to the recommendation by the system 100 is largely positive, then the system 100 can cause, at least in part, an initiation of one or more services to assist the at least one group, the one or more users, or a combination thereof to access the at least one location-based service, the at least one location-based event (e.g., the baseball game), or a combination thereof. For example, the system 100 may cause, at least in part, a transmission of an SMS message to the ticket office requesting to reserve the requisite number of available tickets. However, if the response to the recommendation is largely negative (e.g., because of extreme heat), then the system 100 can determine to recommend another location-based service (e.g., a movie theater), another location-based event (e.g., a water park), or a combination therefore.

As shown in FIG. 1, the system 100 comprises one or more user equipment (UE) 101*a*-101*m* (e.g., mobile phones, tablets, personal navigation devise, etc.) (also collectively referred to as UEs 101) having connectivity to a recommendation platform 103 via a communication network 105. The UEs 101 may include or have access to one or more applications 107*a*-107*m* (e.g., a mapping and/or navigation application, an Internet browser, a social networking application, a media application, etc.) (also collectively referred to as applications 107).

In one embodiment, the recommendation platform 103 may include or be associated with at least one dataset database 109. The recommendation platform 103 may exist in whole or in part within a UE 101, or independently and the dataset database 109 may exist in whole or in part within the recommendation platform 103, or independently. The dataset database 109 may include one or more datasets associated with the at least one group, one or more users, or a combination thereof including, at least in part, one or more reference datasets, one or more behavioral datasets, one or more social datasets, one or more personal datasets, or a combination thereof. The dataset database 109 may also include one or more privacy settings of the one or more users, the at least one group, or a combination thereof. In addition, the dataset database 109 also may include one or more representative icons representing the at least one location-based service (e.g., a restaurant), the at least one location-based event (e.g., a sporting event), or a combination thereof.

The UEs 101 are also connected to a services platform 111 via the communication network 105. The services platform includes one or more services 113*a*-113*n* (also collectively referred to as services 113). The services 113 may include a wide variety of content provisioning services for the applications 107 (e.g., location-based services, advertising services, social networking services, etc.). The services 113 also may include one or more services to assist the at least one group, the one or more users, or a combination thereof to access the at least one location-based service, the at least one location-based event, or a combination thereof (e.g., a restaurant reservation service, a ticket reservation service, etc.). In addition, the UEs 101, the recommendation platform 103, the applications 107, the services platform 111, and the services 113 are also connected to one or more content providers 115a-115p (also collectively referred to as content providers 115) via the communication network 105. The content providers 115 also may provision a wide variety of content (e.g., maps, advertisements, etc.) to the components of the system 100.

In one embodiment, the recommendation platform 103 utilizes location-based technologies (e.g., global positioning system (GPS), cellular triangulation, Assisted GPS (A-GPS), etc.) to determine contextual information associated with the UEs 101 (e.g., a substantially real-time location). In addition, one or more applications 107 (e.g., a mapping and/or navigation application) may also use the location-based technologies to make a request to the services 113 and/or the content providers 115 for location-based data (e.g., mapping and/or navigation information, location-based advertisements, etc.) based on a position relative to a UE 101. For example, a UE 101 may include a GPS receiver to obtain geographic coordinates from the satellites 117 to determine its current position.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, an in-vehicle infotainment system, or any combination thereof, including the accessories and peripherals of these devices, or any combination thereof. It is also contemplated that the UEs 101 can support any type of interface to the user (such as "wearable" circuitry, etc.).

In one embodiment, the recommendation platform 103 first determines at least one group of one or more users within proximity of at least one location-based service (e.g., a market, a church, a restaurant, etc.), at least one location-based event (e.g., a festival, a concert, a sporting event, etc.), or a combination thereof. By way of example, the at least one group of one or more users may be driving in respective vehicles nearby one another using mobile devices (e.g., a mobile phone, a tablet, a personal navigation device, etc.) to navigate between two points (e.g., points "A" and "B"). As previously discussed, in one or more embodiments, the recommendation platform 103 determines the at least one group based, at least in part, on whether one or more datasets associated with the at least one group are at least substantially similar for all or a portion of the one or more users.

In one or more embodiments, the recommendation platform 103 then processes and/or facilitates a processing of the one or more datasets associated with the at least one group to cause, at least in part, a determination of whether to recommend the at least one location-based service (e.g., a restaurant), the at least one location-based event (e.g., a Jazz festival), or a combination thereof to the at least one group. In one example use case, if the recommendation platform 103 determines that the least one group enjoys a particular Jazz band and that band happens to be playing at a nearby Jazz festival, then the recommendation platform 103 may determine to recommend to the at least one group that the Jazz band is playing nearby and that the event offers a group discount for admission. In another example use case, if the recommendation platform 103 determines that the least one group enjoys French food and that there is a French restaurant nearby, the recommendation platform 103 may then determine to recommend to the at least one group that the nearby French restaurant can accommodate a large group that evening.

In one embodiment, recommendation platform 103 also determines one or more privacy settings of the one or more users, the at least one group, or a combination thereof, wherein (a) the determination of whether to recommend; (b) the presentation of the at least one location-based service, the at least one location-based event, or a combination thereof; or (c) a combination thereof is based, at least in part, on the one or more privacy settings. More specifically, the recommendation platform 103 requires explicit user consent (e.g., opting-in) to share privacy sensitive information with the recommendation platform 103 such as a user's location, social networking connections, interests, etc. Moreover, because certain group level recommendations or advertisements make sense only if they can be presented to the entire group (e.g., a group discount on admission fees), the recommendation platform 103 determines the privacy settings or preferences of the at least one group as a whole (e.g., through aggregation, averaging, etc.).

In one or more embodiments, the recommendation platform 103 further determines an anonymity level associated with the at least one group based, at least in part, on a number of the one or more users, wherein the (a) the determination of whether to recommend; (b) the presentation of the at least one location-based service, the at least one location-based event, or a combination thereof; or (c) a combination thereof is based, at least in part, on the anonymity level. Further, the recommendation platform 103 can determine to recommend one or more locations (e.g., a sporting event) for the one or more users to travel based, at least in part, on the anonymity level. As previously discussed, in one example use case, if the recommendation platform 103 determines that the at least one group consists of a small number of users (e.g., two or three), the recommendation platform 103 may not recommend a nearby medically-related service (e.g., a hospital) to the at least one group to avoid incidentally divulging private information about one or more users of the at least one group. On the other hand, if the recommendation platform 103 determines that the at least one group consists of a large number of users, the recommendation platform 103 may determine to recommend a nearby soccer game to the at least one group because most users would not mind other users knowing that they were a soccer fan, liked a particular team playing that day, enjoyed sports, etc.

In one embodiment, the recommendation platform 103 then causes, at least in part, a presentation of the at least one location-based service, the at least one location-based event, or a combination thereof to the at least one group. By way of example, if the recommendation platform 103 determines that two friends are nearby, that they share an interest in Rock and Roll music, and that there is a Rock and Roll festival nearby, the recommendation platform 103 can cause, at least in part, a presentation of a recommendation or an advertisement relating to the Rock and Roll festival with a much higher relevance to the at least one group, the two friends, or a combination thereof. More specifically, the recommendation platform 103 can cause, at least in part, a presentation of the recommendation or the advertisement as a status notification, an SMS message, etc. In one or more embodiments, the recommendation platform 103 also causes, at least in part, a presentation of the at least one location-based service, the at least one location-based event, or a combination thereof in a mapping user interface, a navigation user interface, or a combination thereof (e.g., a turn-by-turn navigation application). For example, a location-based service (e.g., a restaurant) may appear as a representative icon overlaid on the mapping information. Moreover, wherein the mapping user interface, the navigation users interface, or a combination thereof include, at least in part, one or more alternative travel routes, the recommendation platform 103 can cause, at least in part, a presentation of the least one location-based service, the at least one location-based event, or a combination thereof with respect to the one or more alternative travel routes. By way of example, in one example use case, the recommendation platform 103 may cause, at least in part, a presentation of the at least one location-based service, for example, as a representative icon below the mapping information, including distance and duration information.

In one or more embodiments, the recommendation platform 103 may also determine one or more responses from the at least one group, the one or more users, or a combination thereof to presentation of the at least one location-based service, the at least one location-based event, or a combination thereof. For example, the recommendation platform 103 may determine that the at least one group shares an interest in football and that a football game is being played nearby that afternoon. In one embodiment, if the response of the at least one group to the recommendation by the recommendation platform 103 is largely positive, then the recommendation platform 103 can cause, at least in part, an initiation of one or more services to assist the at least one group, the one or more users, or a combination thereof to access the at least one location-based event. For example, the system 100 can cause, at least in part, a transmission of an SMS message, for example, to the ticket office of the stadium requesting to reserve the requisite number of available tickets. However, if the response is largely negative (e.g., because of extreme heat), the recommendation platform 103 can determine to recommend another location-based service (e.g., a movie theater), another location-based event (e.g., a water park), or a combination thereof.

By way of example, the UEs 101, the recommendation platform 103, the applications 107, the dataset database 109, the services platform 111, the services 113, the content provider 115, and the satellites 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
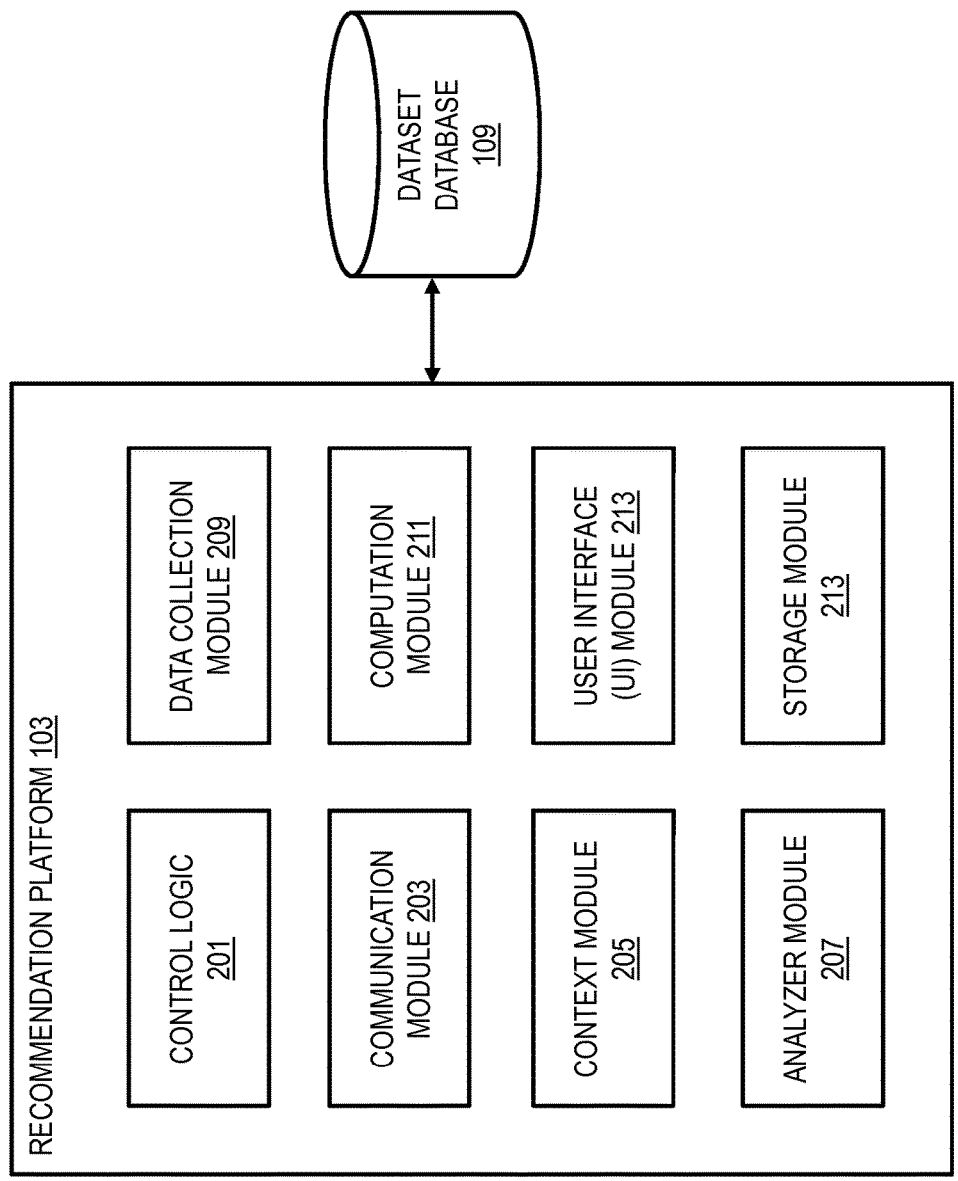
FIG. 2 is a diagram of the components of a recommendation platform, according to one embodiment.

FIG. 2 is a diagram of the components of a recommendation platform 103, according to one embodiment. By way of example, the recommendation platform 103 includes one or more components for providing alternative route recommendations for a group of nearby users in a privacy preserving manner. It is contemplated that the functions of these components may be combined in one or more components or performed by other components of equivalent functionality. In this embodiment, the recommendation platform 103 includes a control logic 201, a communication module 203, a context module 205, an analyzer module 207, a data collection module 209, a computation module 211, a user interface (UI) module 213, and a storage module 215.

The control logic 201 oversees tasks, including tasks performed by the communication module 203, the context module 205, the analyzer module 207, the data collection module 209\bf{8}, the computation module 211, the user interface (UI) module 213, and the storage module 215. For example, although other modules may perform the actual task, the control logic 201 may determine when and how those tasks are performed or otherwise direct the other modules to perform the task. In addition, the control logic 201, in connection with the communication module 203, may cause, at least in part, an initiation of one or more services to assist the at least one group, the one or more users, or a combination thereof to access the at least one location-based service, the at least one location-based event, or a combination thereof.

The communication module 203 is used for communication between the UEs 101, the recommendation platform 103, the applications 107, the dataset database 109, the services platform 111, the services 113, the content providers 115, and the satellites 117. The communication module 203 may also be used to communicate commands, requests, data, etc. In addition, the communication module 203 may be used in connection with the user interface (UI) module 213 to cause, at least in part, a presentation of the at least one location-based service, the at least one location-based event, or a combination thereof to the at least one group, the one or more users, or a combination thereof (e.g., as a status notification, an SMS, etc.) based, at least in part, on the determination of whether to recommend. The communication module 203, in connection with the UI module 213 may also be used to cause, at least in part, a presentation of the at least one location-based service, the at least one location-based event, or a combination thereof in a mapping user interface, a navigation user interface, or a combination thereof (e.g., a turn-by-turn navigation application).

Moreover, the communication module 203, in connection with the UI module 213, also may be used, wherein the mapping user interface, the navigation interface, or a combination thereof include, at least in part, one or more alternative travel routes, to cause, at least in part, a presentation of the at least one location-based service, the at least one location-based event, or a combination thereof with respect to the one or more alternative travel routes (e.g., as a representative icon including distance and duration information). Further, the communication module 203, in connection with the UI module 213, may also be used to determine one or more responses from the at least one group, the one or more users, or a combination thereof to the presentation of the at least one location-based service, the at least one location-based event, or a combination thereof. As previously discussed, the communication module 203, in connection with the control logic 201, may also be used to cause, at least in part, an initiation of one or more services to assist the at least one group, the one or more users, or a combination thereof to access the at least one location-based service, the at least one location-based event, or a combination thereof (e.g., transmitting an SMS to reserve the requisite number of available seats at an event).

The context module 205 is used to determine contextual information associated with each mobile device (e.g., a mobile phone, a tablet, a personal navigation device, etc.). More specifically, the context module 205 may be used to determine at least one group of one or more users within proximity of at least one location-based service, at least one location-based event, or a combination thereof based, at least in part, on one or more location-based technologies (e.g., GPS, cellular triangulation, A-GPS, etc.). The context module 205 may also be used in connection with the analysis module 207 to determine to recommend one or more locations (e.g., a sporting event) for the one or more users to travel based, at least in part, on the anonymity level determined by the computation module 211.

The analysis module 207 is used to determine the at least one group based, at least in part, on whether the one or more reference datasets, the one or more behavioral datasets, the one or more social datasets, the one or more personal datasets, or a combination thereof are at least substantially similar for all or a portion of the one or more users. The analysis module 207 may also be used to process and/or facilitate a processing of the one or more datasets associated with the at least one group to cause, at least in part, a determination of whether to recommend the at least one location-based service, the at least on location-based event, or a combination thereof to the at least one group. By way of example, if the analysis module 207 determines from the one or more datasets that the at least one group enjoys a particular Jazz band and that Jazz band happens to be playing at a nearby music festival, the analysis module 207 may determine to recommend to the at least one group that the Jazz band is playing nearby and that the event offers a group discount for admission. As previously discussed, the analysis module 207, in connection with the context module 205, also may be used to determine to recommend one or more locations for the one or more users to travel based, at least in part, on the anonymity level determined by the computation module 211.

The data collection module 209 is used to determine one or more privacy settings of the one or more users, the at least one group, or a combination thereof, wherein (a) the determination of whether to recommend; (b) the presentation of the at least one location-based service, the at least one location-based event, or a combination thereof; or (c) a combination thereof is based, at least in part, on the privacy information. For example, the data collection module 209 requires explicit user consent (e.g., opting-in) to share privacy sensitive information with the recommendation platform 103 such as a user's location, social networking connections, interests, etc.

As previously discussed, the computation module 211 is used to determine an anonymity level associated with the at least one group based, at least in part, on a number of the one or more users, wherein (a) the determination of whether to recommend; (b) the presentation of the at least one location-based service, the at least one location-based event, or a combination thereof; or (c) a combination thereof is based, at least in part, on the anonymity level. In addition, the computation module 211, in connection with the data collection module 209 and the analysis module 207, may assess the anonymity level in relation to the particular location-based service, the particular location-based event, or a combination thereof in terms of privacy. For example, medically-related services may require more users in the at least one group to establish a level of anonymity compared to a sporting event, a festival, or a concert.

The user interface (UI) module 213 is used in connection with the communication module 203 to cause, at least in part, a presentation of the at least one location-based service, the at least one location-based event, or a combination thereof to the at least one group, the one or more users, or a combination thereof based, at least in part, on the determination of whether to recommend. As previously discussed, the UI module 213 may also be used in connection with the communication module 203 to cause, at least in part, a presentation of the recommendation in a mapping user interface, a navigation user interface, or a combination thereof. By way of example, the UI module 213 can present the recommendation as a status notification, an SMS message, a representative icon overlaid on mapping information, a representative icon below mapping information, including distance and duration information, etc. In addition, the UI module 213 also may be used in connection with the communication module 203 to determine one or more responses from the at least one group, the one or more users, or a combination thereof to the presentation of the at least one location-based service, the at least one location-based event, or a combination thereof. By way of example, it is contemplated that the one or more responses may include a keypad entry, a voice command, etc. using a user interface (e.g., a graphical user interface (GUI)) of a mobile device (e.g., a mobile phone, a tablet, a personal navigation device, etc.).

The storage module 215 is used in connection with the communication module 203 to manage the one or more datasets associated with the at least one group, one or more users, or a combination thereof contained in the dataset database 109 and including, at least in part, one or more reference datasets, one or more behavioral datasets, one or more social datasets, one or more personal datasets, or a combination thereof. The storage module 215 may also be used to manage the one or more privacy settings of the one or more users, the at least one group, or a combination thereof as well as the one or more representative icons representing the at least one location-based service (e.g., a restaurant, a church, a hospital, etc.), the at least one location-based event (e.g., a festival, a concert, a sporting event, etc.), or a combination thereof also contained in the dataset database 109.

Figure 3:
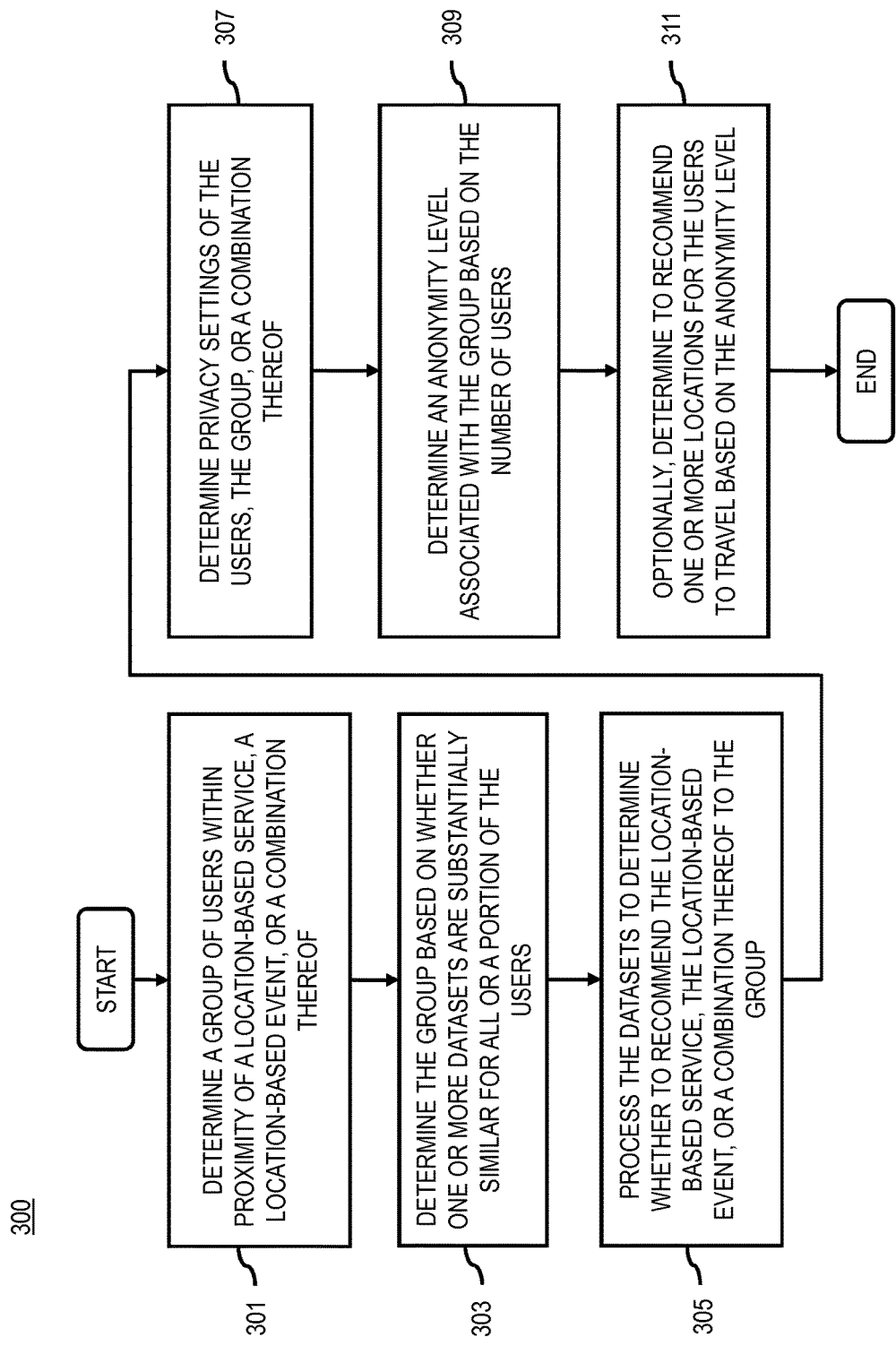
FIGS. 3 and 4 are flowcharts of processes for providing alternative route recommendations for a group of nearby users in a privacy preserving manner, according to one embodiment.
Figure 4:
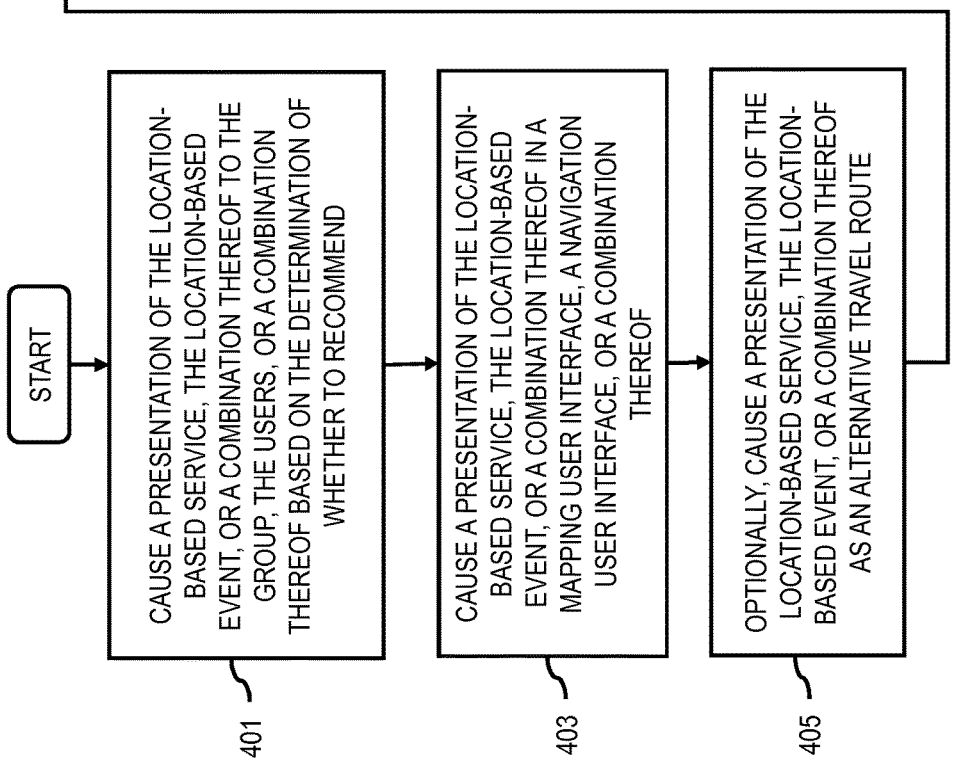
Figure 7:
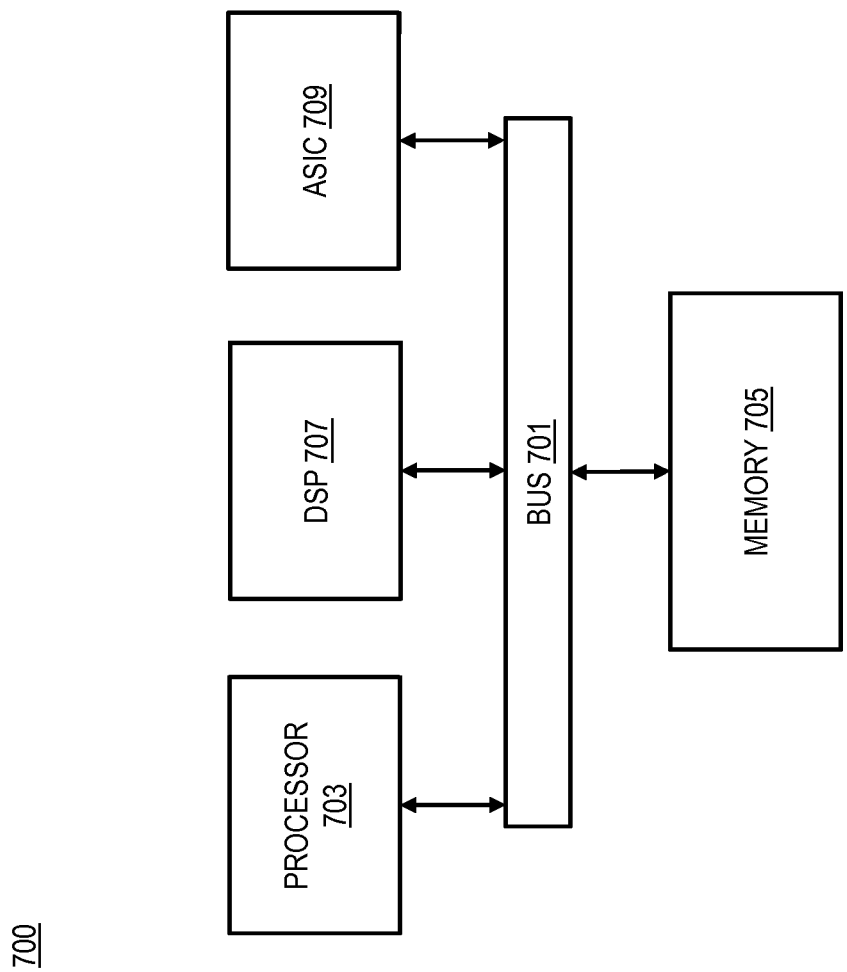
FIG. 7 is a diagram of a chip set that can be used to implement an embodiment of the invention.

FIGS. 3 and 4 are flowcharts of processes for providing alternative route recommendations for a group of nearby users in a privacy preserving manner, according to one embodiment. FIG. 3 depicts a process 300 of determining at least one group of one or more users. In one embodiment, the recommendation platform 103 performs the process 300 and is implemented in, for instance, a chip set including a processor and a memory as shown in FIG. 7. In step 301, the recommendation platform 103 determines at least one group of one or more users within proximity of at least one location-based service, at least one location-based event, or a combination thereof. More specifically, the at least one location-based service, the at least one location-based event, or a combination thereof includes, at least in part, a group-oriented service, a group-oriented event, or a combination thereof. By way of example, the at least one group of one or more users may be driving in respective vehicles nearby one another using mobile devices (e.g., mobile phones, tablets, personal navigation devices, etc.) to navigate between two points (e.g., points "A" and "B"). In addition, the at least one location-based service may include static services such as a market, a church, a restaurant, etc. and the at least one location-based event may include real-time events of the day such as a festival, a concert, a sporting event, etc.

In step 303, the recommendation platform 103 determines the at least one group based, at least in part, on whether the one or more reference datasets, the one or more behavioral datasets, the one or more social datasets, the one or more personal datasets, or a combination thereof are at least substantially similar for all or a portion of the one or more users. In one example use case, the one or more reference datasets may include, at least in part, user location information, including both past and present locations; the one or more behavioral datasets may include, at least in part, information about a user's habits, preferences, etc.; the one or more social datasets may include, at least in part, user social relationship information, user social networking connections (e.g., friends, colleagues, acquaintances, etc.), etc.; and the one or more personal datasets may include, at least in part, user profiles, user history, user interests, etc.

In step 305, the recommendation platform 103 processes and/or facilitates a processing of one or more datasets associated with the at least one group to cause, at least in part, a determination of whether to recommend the at least one location-based service, the at least one location-based event, or a combination thereof to the at least one group. By way of example, if the recommendation platform 103 determines that the at least one group enjoys a particular Rock and Roll band and that Rock and Roll band happens to be playing at a nearby music festival, the recommendation platform may determine to recommend to the at least one group that the Rock band is playing nearby and that the event offers a group discount for admission. In another example use case, if the recommendation platform 103 determines that the at least one group enjoys Italian food and that there is an Italian restaurant nearby, the recommendation platform 103 may determine to recommend to the at least one group that the nearby Italian restaurant can accommodate a large group that evening and/or offers group discounts.

In step 307, the recommendation platform 103 determines one or more privacy settings of the one or more users, to the at least one group, or a combination thereof, wherein (a) the determination of whether to recommend; (b) the presentation of the at least one location-based service, the at least one location-based event, or a combination thereof; or (c) a combination thereof is based, at least in part, on the one or more privacy settings. By way of example, the recommendation platform 103 requires explicit user consent (e.g., opting-in) to share privacy sensitive information with the recommendation platform 103 such as a user's location, social networking connections, interests, etc. Moreover, because certain group level recommendations or advertisements make sense only if they can be presented to the entire group (e.g., a group discount on admission fees), the recommendation platform 103 determines the privacy settings or preferences of the at least one group as a whole (e.g., through aggregation, averaging, etc.).

In step 309, the recommendation platform 103 determines an anonymity level associated with the at least one group based, at least in part, on a number of the one or more users, wherein (a) the determination of whether to recommend; (b) the presentation of the at least one location-based service, the at least one location-based event, or a combination thereof; or (c) a combination thereof is based, at least in part, on the anonymity level. In step 311, the recommendation platform 103 optionally determines to recommend one or more locations for the one or more users to travel based, at least in part, on the anonymity level. By way of example, if the recommendation platform 103 determines that the at least one group consists of a small number of users (e.g., two or three), the recommendation platform 103 may not recommend a nearby medically-related service (e.g., a hospital) to the at least one group to avoid incidentally divulging private information about one or more users of the at least one group. In contrast, if the recommendation platform 103 determines that the at least one group consists of a large number of users, the recommendation platform 103 may determine to recommend a nearby baseball game to the at least one group because most users would not mind other users knowing that they were baseball fans, liked a particular team playing that day, enjoyed sporting events, etc.

FIG. 4 depicts a process 400 of causing, at least in part, a presentation of at least one location-based service, at least one location based-event, or a combination thereof to the at least one group. In one embodiment, the recommendation platform 103 performs the process 400 and is implemented in, for instance, a chip set including a processor and a memory as shown in FIG. 7. In step 401, the recommendation platform 103 causes, at least in part, a presentation of the at least one location-based service, the at least one location-based event, or a combination thereof to the at least one group, the one or more users, or a combination thereof based, at least in part, on the determination of whether to recommend. By way of example, if the recommendation platform 103 determines that two or three friends are nearby, that they share an interest in Jazz music, and that there are is a Jazz music festival nearby, the recommendation platform 103 can cause, at least in part, a presentation of a recommendation or an advertisement relating to the Jazz festival with a much higher relevance to the at least one group, the two or three friends, or a combination thereof. More specifically, the recommendation platform 103 can cause, at least in part, a presentation of the recommendation or the advertisement as a status notification, an SMS message, etc.

In step 403, the recommendation platform 103 causes, at least in part, a presentation of the at least one location-based service, the at least one location-based event, or a combination thereof in a mapping user interface, a navigation user interface, or a combination thereof. For example, the recommendation platform 103 can cause, at least in part, the presentation of a location-based service (e.g., a restaurant) as a representative icon overlaid on the mapping information. In step 405, wherein the mapping user interface, the navigation user interface, or a combination thereof include, at least in part, one or more alternative travel routes, the recommendation platform 103 optionally causes, at least in part, a presentation of the at least one location-based service, the at least one location-based event, or a combination thereof with respect to the one or more alternative travel routes. By way of example, the recommendation platform 103 may cause, at least in part, a presentation of a location-based service (e.g., a restaurant) as a representative icon below the mapping information, including distance and duration information.

In step 407, the recommendation platform 103 optionally determines one or more responses from the at least one group, the one or more users, or a combination thereof to the presentation of the at least one location-based service, the at least one location-based event, or a combination thereof. By way of example, the recommendation platform 103 may determine that the at least one group shares an interest in soccer and that a soccer game is being played nearby that afternoon. In one embodiment, if the response of the at least one group to the recommendation by the recommendation platform 103 is positive, then in step 409, the recommendation platform 103 optionally causes, at least in part, an initiation of one or more services to assist the at least one group, the one or more users, or a combination thereof attend the at least one location-based service, the at least one location-based event, or a combination thereof. For example, the recommendation platform 103 may cause, at least in part, a transmission of an SMS message, for example, to the ticket office of the soccer stadium requesting to reserve the requisite number of available tickets. However, if the response is largely negative (e.g., because of extreme heat), the recommendation platform can determine to recommend another location-based service (e.g., a movie theater), another location-based event (e.g., a water park), or a combination thereof.

Figure 5:
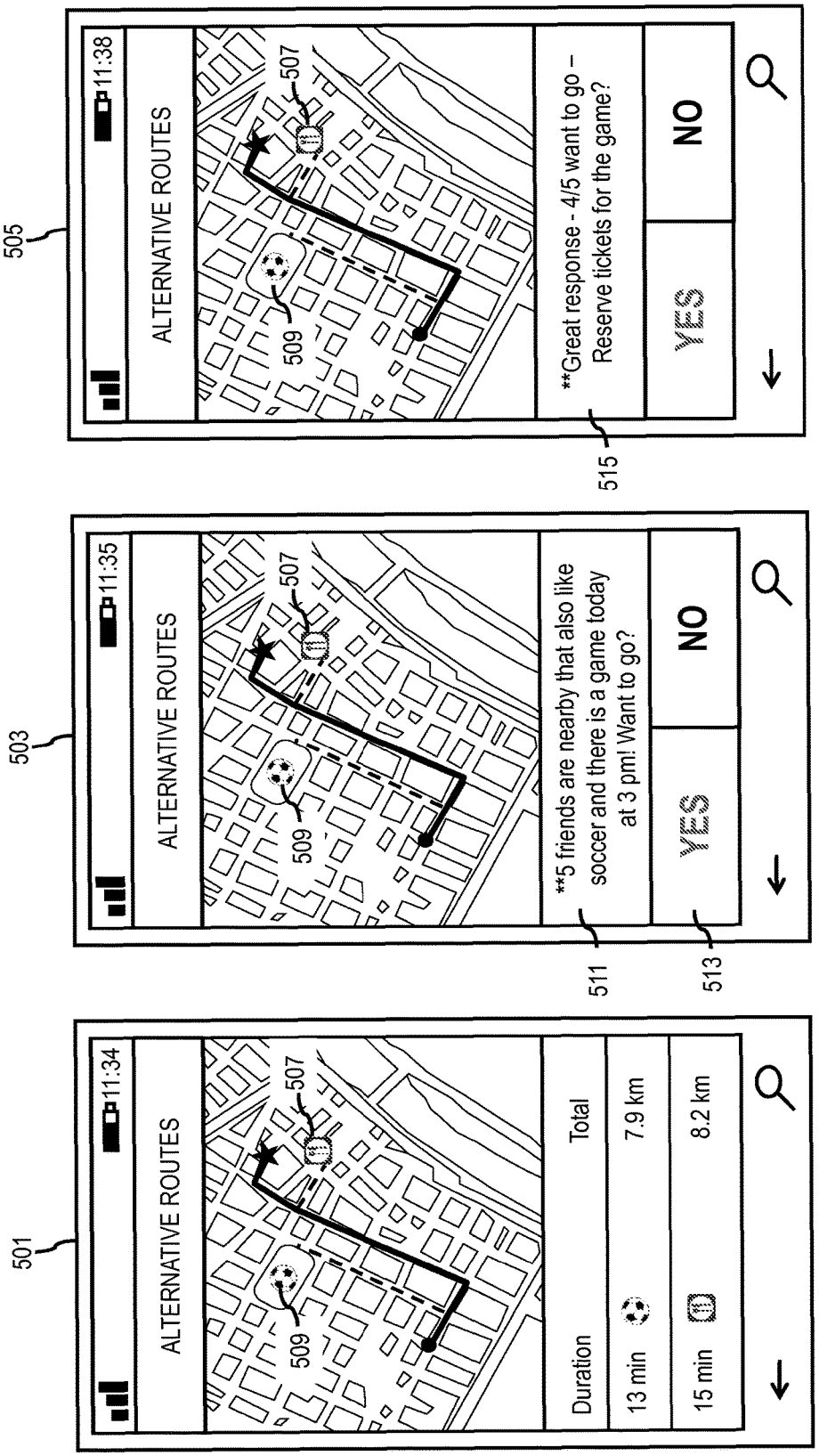
FIG. 5 is a diagram of user interfaces utilized in the processes of FIGS. 3 and 4, according to various embodiments.

FIG. 5 is a diagram of user interfaces utilized in the processes of FIGS. 3 and 4, according to various embodiments. As shown, the example user interfaces of FIG. 5 include one or more user interface elements and/or functionalities created and/or modified based, at least in part, on information, data, and/or signals resulting from the processes (e.g., processes 300 and 400) described with respect to FIGS. 3 and 4. More specifically, FIG. 5 illustrates three user interfaces (e.g., interfaces 501, 503, and 505) depicting alternative routes in a mapping and/or navigation interface of a mobile phone.

In one embodiment, the system 100 first determines at least one group of one or more users within proximity of at least one location-based service (e.g., a restaurant 507), at least one location-based event (e.g., a soccer game 509), or a combination thereof. In this example use case, the at least one group of one or more users (e.g., 5 users) are driving in respective vehicles nearby one another using mobile devices (e.g., mobile phones, tablets, personal navigation devices, etc.) to navigate. One user in particular is using his or her mobile device (e.g., interfaces 501, 503, and 505) to navigate between two points (e.g., points "A" and "B") as depicted in the user interfaces 501, 503, and 505 by the circle and the star, respectively. In one or more embodiments, the system 100 determines the at least one group (e.g., 5 users) based, at least in part, on whether the one or more datasets associated with the at least one group are at least substantially similar for all or a portion of the one or more users. More specifically, the one or more one or more datasets include, at least in part, one or more reference datasets (e.g., user location information), one or more behavioral datasets (e.g., user preferences); one or more social networking datasets (e.g., user social networking connections), one or more personal datasets (e.g., user interests), or a combination thereof. In this example use case, the five friends in the nearby vicinity of one another all share a social networking connection and are fans of the same soccer team that is playing in the nearby stadium at 3 pm that afternoon. In addition, a couple of the friends also enjoy French food and the restaurant 507 is a French restaurant.

In one or more embodiments, the system 100 then processes and/or facilitates a processing of the one or more datasets (e.g., reference datasets, social networking datasets, and personal datasets) associated with the at least one group to cause, at least in part, a determination of whether to recommend the at least one location-based service (e.g., the restaurant 507), the at least one location-based event (e.g., the soccer game 509), or a combination thereof to the at least one group. As previously discussed, the system 100 also determines one or more privacy settings of the one or more users, the at least one group, or a combination thereof, wherein (a) the determination of whether to recommend; (b) the presentation of the at least one location-based service (e.g., the restaurant 507), the at least one location-based event (e.g., the soccer game 509), or a combination thereof; or (c) a combination thereof is based, at least in part, on the one or more privacy settings. In this example use case, the five friends have all decided to share information about their respective locations, social networking connections, and interests with nearby friends that they share a social networking connection with.

In one or more embodiments, the system 100 further determines an anonymity level associated with the at least one group based, at least in part, on a number of the one or more users, wherein (a) the determination of whether to recommend; (b) the presentation of the at least one location-based service (e.g., the restaurant 507), the at least one location-based event (e.g., the soccer game 509), or a combination thereof; or (c) a combination thereof is based, at least in part, on the anonymity level. In this example use case, the system 100 determines that there are five users within the group and the at least one location-based service (e.g., the restaurant 507) and the at least one location-based event (e.g., the soccer game 509) are neither services nor events that users would generally mind other users knowing. Moreover, the system 100 has already determined that the five friends are willing to share information relating to their respective locations, social networking connections, and interests among the group.

In one embodiment, the system 100 then causes, at least in part, a presentation of the at least one location-based service (e.g., the restaurant 507), the at least one location-based event (e.g., the soccer game 509), or a combination thereof to the at least one group as depicted in interface 501. More specifically, in this example use case, the system 100 causes, at least in part, a presentation of the restaurant 507 and the soccer game 509 as representative icons overlaid on the mapping information and the system 100 also causes, at least in part, a presentation of alternative route information below the mapping information, including distance and duration information. In addition, whereas the original route calculated by the mapping and/or navigation application is depicted as a solid line in interfaces 501, 503, and 505, the alternative routes to the restaurant 507 and the soccer game 509 determined by the system 100 are depicted as dashed lines.

In one or more embodiments, the system 100 may also determine one or more responses from the group, the one or more users (e.g., the user of interfaces 501, 503, and 505), or a combination thereof to the presentation of the restaurant 507 and the soccer game 509. For example, as depicted in interface 503, the system 100 causes, at least in part, a presentation of the message 511 "5 friends are nearby that also like soccer and there is a game today at 3 pm! Want to go?" As illustrated in interface 503, the user of interfaces 501, 503, and 505 has indicated a positive response 513 to the message 511. As previously discussed, in one embodiment, if the response of the group to the recommendation by the system 100 is largely positive as shown in message 515 (e.g., "Great response—4/5 want to go") of the interface 505, then the system 100 can cause, at least in part, an initiation of one or more services (e.g., a ticket reservation service) to assist the group, the one or more users (e.g., the user of interfaces 501, 503, and 505), or a combination thereof to access the soccer game 509. For example, the system 100 can cause, at least in part, a transmission of an SMS message to the ticket office of the stadium requesting to reserve the requisite number of available tickets (e.g., 4 tickets). However, if the response was largely negative (e.g., only 1 or 2 of the 5 responded positively), then the system 100 can determine to again recommend the restaurant 507** or to present another location-based service, another location-based event, or a combination thereof.

The processes described herein for providing alternative route recommendations for a group of nearby users in a privacy preserving manner may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
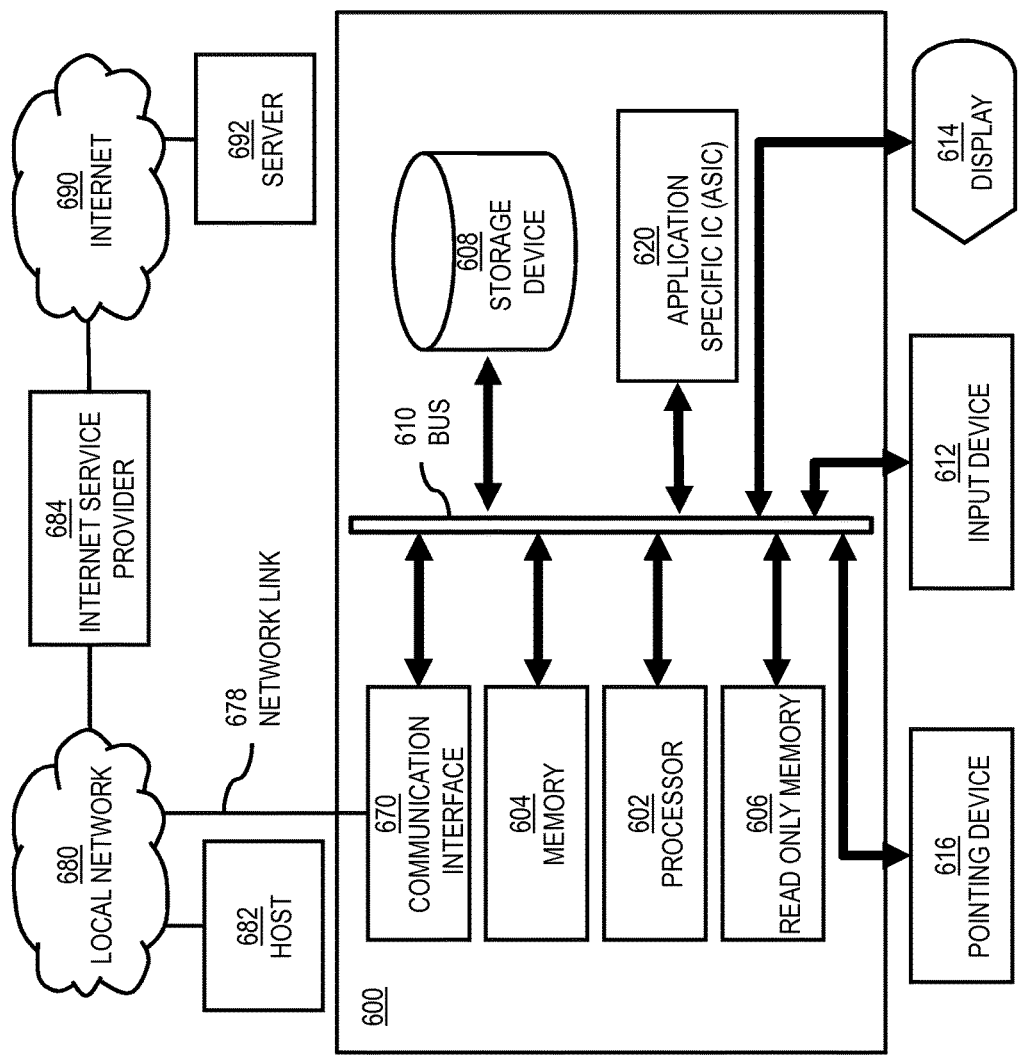
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to provide alternative route recommendations for a group of nearby users in a privacy preserving manner as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of providing alternative route recommendations for a group of nearby users in a privacy preserving manner.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to provide alternative route recommendations for a group of nearby users in a privacy preserving manner. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for providing alternative route recommendations for a group of nearby users in a privacy preserving manner. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for providing alternative route recommendations for a group of nearby users in a privacy preserving manner, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for providing alternative route recommendations for a group of nearby users in a privacy preserving manner to the UEs 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to provide alternative route recommendations for a group of nearby users in a privacy preserving manner as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of providing alternative route recommendations for a group of nearby users in a privacy preserving manner.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to provide alternative route recommendations for a group of nearby users in a privacy preserving manner. The memory 705 also stores the data associated with or generated by the execution of the inventive steps.

Figure 8:
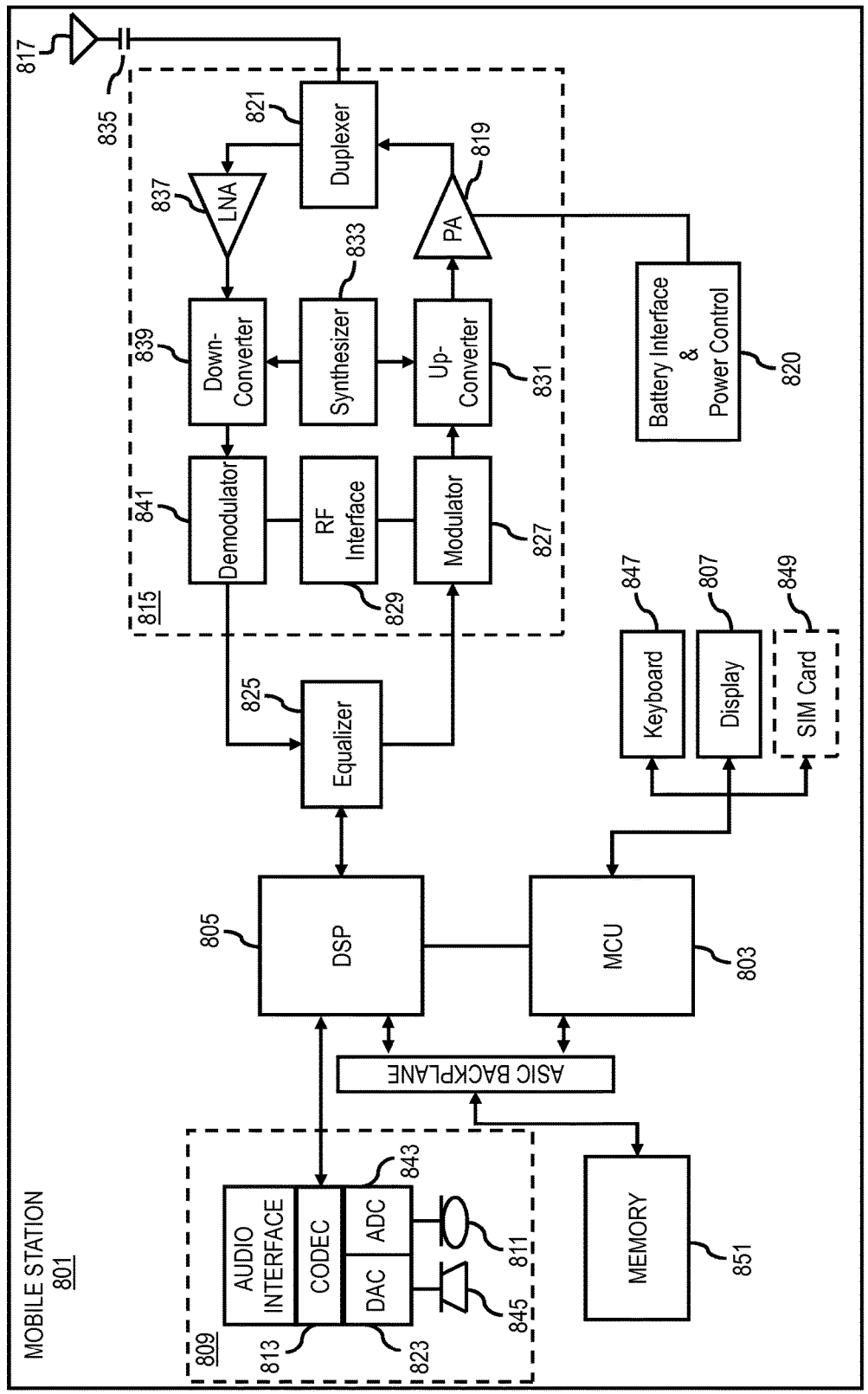
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of providing alternative route recommendations for a group of nearby users in a privacy preserving manner. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of providing alternative route recommendations for a group of nearby users in a privacy preserving manner. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to provide alternative route recommendations for a group of nearby users in a privacy preserving manner. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising: providing for determination by a processor of at least one group of two or more users within proximity of at least one location-based event, wherein proximity is established based on one or more of a global positioning system sensor or cellular triangulation associated with each of the users; providing for determination of one or more privacy settings of the two or more users, to the at least one group, or a combination thereof; processing, by the processor, one or more datasets associated with the at least one group to cause, at least in part, a determination of whether to provide for recommendation of attending the at least one location-based event to the at least one group; providing for presentation of the at least one location-based event and one or more alternative travel routes to the at least one location-based event to each of the two or more users of the at least one group from their respective current positions based, at least in part, on the determination of whether to recommend; providing for determination of one or more responses from a first user of the at least one group to the presentation of the at least one location-based event; and providing for an initiation of one or more services to at least a second user of the at least one group based on the one or more responses from the first user, the one or more services being to assist at least the second user to attend the at least one location-based event, wherein (a) the determination of whether to recommend; (b) the presentation of the at least one location-based event; or (c) a combination thereof is based, at least in part, on the one or more privacy settings, and wherein the one or more responses from the first user are provided via an input to a user interface.

2. The method of claim 1, further comprising: providing for presentation of the at least one location-based event in a mapping user interface, a navigation user interface, or a combination thereof, of at least one of the two or more users.

3. The method of claim 1, wherein the one or more datasets includes, at least in part, one or more reference datasets, one or more behavioral datasets, one or more social datasets, one or more personal datasets, or a combination thereof.

4. The method of claim 3, further comprising: providing for determination of the at least one group based, at least in part, on whether the one or more reference datasets, the one or more behavioral datasets, the one or more social datasets, the one or more personal datasets, or a combination thereof are at least substantially similar for all or a portion of the two or more users.

5. The method of claim 1, further comprising: providing for determination of an anonymity level associated with the at least one group based, at least in part, on a number of the two or more users, wherein (a) the determination of whether to recommend; (b) the presentation of the at least one location-based event; or (c) a combination thereof is based, at least in part, on the anonymity level.

6. The method of claim 5, further comprising: providing for determination to recommend one or more locations for the two or more users to travel based, at least in part, on the anonymity level.

7. The method of claim 1, wherein the at least one location-based event includes, at least in part, a group-oriented service, a group-oriented event, or a combination thereof.

8. An apparatus comprising: at least one processor; and at least one memory including computer program code for one or more programs, the at least one memory and the computer program code configured to, with the at least one processor, cause the apparatus to perform at least the following: determine at least one group of two or more users within proximity of at least one location-based event, wherein proximity is established based on one or more of a global positioning system sensor or cellular triangulation associated with each of the users; determine one or more privacy settings of the two or more users, to the at least one group, or a combination thereof; process one or more datasets associated with the at least one group to cause, at least in part, a determination of whether to provide for recommendation of attending the at least one location-based event to the at least one group; cause, at least in part, a presentation of the at least one location-based event and one or more alternative travel routes to the at least one location-based event to each of the two or more users of the at least one group from their respective current positions based, at least in part, on the determination of whether to recommend; determine one or more responses from the at least one group, the two more users, or a combination thereof to the presentation of the at least one location-based event; and cause, at least in part, an initiation of one or more services to assist the group, the two or more users, or a combination thereof to attend the at least one location-based event, wherein (a) the determination of whether to recommend; (b) the presentation of the at least one location-based event; or (c) a combination thereof is based, at least in part, on the one or more privacy settings, and wherein the one or more responses are provided via an input to a user interface.

9. The apparatus of claim 8, wherein the apparatus is further caused to: cause, at least in part, a presentation of the at least one location-based event in a mapping user interface, a navigation user interface, or a combination thereof, of at least one of the two or more users.

10. The apparatus of claim 8, wherein the one or more datasets includes, at least in part, one or more reference datasets, one or more behavioral datasets, one or more social datasets, one or more personal datasets, or a combination thereof.

11. The apparatus of claim 10, wherein the apparatus is further caused to: determine the at least one group based, at least in part, on whether the one or more reference datasets, the one or more behavioral datasets, the one or more social datasets, the one or more personal datasets, or a combination thereof are at least substantially similar for all or a portion of the two or more users.

12. The apparatus of claim 8, wherein the apparatus is further caused to: determine an anonymity level associated with the at least one group based, at least in part, on a number of the two or more users, wherein (a) the determination of whether to recommend; (b) the presentation of the at least one location-based event; or (c) a combination thereof is based, at least in part, on the anonymity level.

13. The apparatus of claim 12, wherein the apparatus is further caused to: determine to recommend one or more locations for the two or more users to travel based, at least in part, on the anonymity level.

14. The apparatus of claim 8, wherein the at least one location-based event includes, at least in part, a group-oriented service, a group-oriented event, or a combination thereof.

\* \* \* \* \*